United States Patent [19]

Roberts

[11] Patent Number: 5,112,696

[45] Date of Patent: May 12, 1992

[54] TOUGH MONOLAYER SHRINK FILM FOR PRODUCTS CONTAINING MOISTURE

[75] Inventor: Richard K. Roberts, Clinton, Iowa

[73] Assignee: E. I. Du Pont de Nemours and Company, Wilmington, Del.

[21] Appl. No.: 670,327

[22] Filed: Mar. 15, 1991

Related U.S. Application Data

[63] Continuation-in-part of Ser. No. 383,330, Jul. 20, 1989, abandoned.

[51] Int. Cl.$^5$ .................. C08L 23/08; C08L 23/16; B32B 27/32; B29C 55/02
[52] U.S. Cl. ................................. 428/516; 525/52; 525/222; 525/227; 525/240; 264/210.1; 264/210.2; 264/331.17
[58] Field of Search ............... 525/240, 222, 227, 52; 428/516

[56] References Cited

U.S. PATENT DOCUMENTS

| | | | |
|---|---|---|---|
| 4,457,960 | 7/1984 | Newsone | 525/222 |
| 4,590,124 | 5/1986 | Schoenberg | 482/516 |
| 4,597,920 | 7/1986 | Golike | 525/240 |
| 4,623,567 | 11/1986 | Hert | 525/240 |
| 4,623,581 | 11/1986 | Hert | 428/220 |
| 4,640,856 | 2/1987 | Ferguson et al. | 428/516 |
| 4,877,663 | 10/1989 | Kambe et al. | 525/222 |

FOREIGN PATENT DOCUMENTS

| | | |
|---|---|---|
| 0240745 | 10/1987 | European Pat. Off. |
| 61-258849 | 11/1986 | Japan |
| 62-010150 | 1/1987 | Japan |
| 62-064846 | 3/1987 | Japan |
| 2077273 | 12/1981 | United Kingdom |

OTHER PUBLICATIONS

"VLDPE-A New Class of Polyethylenes", Plactics & Rubber International, vol. 11, No. 2, pp. 34-36 (Apr. 1986).

Primary Examiner—Carman J. Seccuro
Attorney, Agent, or Firm—David M. Shold

[57] ABSTRACT

A blend of an ethylene-alpha olefin linear copolymer having a density of about 0.890 to about 0.914, a tubular low-density polyethylene, and optionally a copolymer of ethylene with at least one copolymerized vinyl alkanoate, alkyl acrylate, or alkyl methacrylate and a linear low density polyethylene provides a shrink film particularly useful for packaging e.g. fish or poultry.

18 Claims, No Drawings

TOUGH MONOLAYER SHRINK FILM FOR PRODUCTS CONTAINING MOISTURE

BACKGROUND OF THE INVENTION

This is a continuation-in-part of U.S. application Ser. No. 07/383,330, filed Jul. 20, 1989, now abandoned, the disclosure of which is incorporated herein by reference.

This invention relates to polyolefin based shrink films which are particularly suitable for packaging solid foods with high water content.

U.S. Pat. No. 4,760,116 discloses a single layer heat shrinkable film consisting essentially of a blend of 99.5–98.5 weight % linear low or medium density polyethylene and 0.5–1.5 weight % of one or more copolymers of ethylene with a monomer selected from vinyl acetate and acrylic acids or esters, irradiated by a dosage of about 1 to 5 megarads. The films have a broad shrink temperature range and a low coefficient of friction when heated.

U.S. Pat. No. 4,671,987 discloses stretch wrap composite films of at least two layers. One outside layer is a tackified ethylene vinyl acetate copolymer; another outside layer is very low density polyethylene. A third, inside, layer is linear low density polyethylene. The layer of very low density polyethylene can be a blend with up to about 50 weight % polyethylene homopolymer, ethylene-vinyl acetate copolymer, linear low density polyethylene, and mixtures of these compounds.

U.S. Pat. No. 4,640,856 discloses a multilayer, thermoplastic shrink film having a substrate layer of very low density polyethylene and a gas barrier layer of vinylidene chloride copolymer or ethylene-vinyl alcohol, useful for packaging of meat. In certain applications, blends of VLDPE, LLDPE and/or EVA may be used to achieve desired properties.

European patent application 0 236 099, discloses a multilayer film useful in food packaging which may be oriented to provide a shrinkable film with good oxygen barrier properties. Outer layers comprise a polymeric material or blend of polymeric materials, such as a blend of LLDPE (preferably about 70-80%) and VLDPE (preferably about 20-30%) or a blend of LLDPE with LMDPE and EVA.

U.S. Pat. No. 4,547,433 and U.S. Pat. No. 4,495,249 disclose a heat shrinkable laminate film comprising a core layer of a gas barrier resin and an outer layer of a blend of an ethylene alpha olefin copolymer, density 0.900–0.950, with less than 80% of an ethylene vinyl acetate copolymer, crosslinked by ionizing irradiation.

U.S. Pat. No. 4,537,376 discloses a heat shrinkable multilayer film for packaging meat. A core layer comprises a vinylidene chloride-vinyl chloride copolymer. One outer layer comprises an ethylene vinyl acetate copolymer. Another outer layer comprises a blend of ethylene vinyl acetate copolymer (20–80%), propylene ethylene copolymer (10–40%), and 1-butene ethylene copolymer (10–40%). The blend composition can be used as a single layer film or as a component layer or layers in a multiple-ply film structure.

Derwent Abstract 87-240136/34, citing Japanese application J62 164 744, published Jul. 21, 1987, discloses a shrinkable film comprising (a) 30–70 parts ethylene alpha olefin copolymer having density of 0.86–0.94; (b) 30–70 parts ethylene vinyl acetate copolymer; (c) 3–15 parts ethylene ethyl acrylate copolymer; and (d) 0.5–10 parts polybutene.

For many applications, particularly for packaging of fish and poultry products on trays, a shrink film with certain improved mechanical and shrinkage properties is desirable. The present invention provides such a film. The film of the present invention is strong, having an average tensile strength of at least about 69 MPa (10 kpsi) and an average elongation at break of at least 150%. The film has an average modulus of at least about 138 MPa (20 kpsi), which is sufficiently stiff to be handled readily by existing packaging machines. The film exhibits an area shrinkage of at least about 30% at 90° C. and at least about 75% at 110° C., thus allowing the preparation of snugly packaged items. It exhibits a recovery of deformation after five minutes of at least about 88% and after 60 minutes of at least about 92%, thus permitting packages made with such film to resume their original shape after deformation by some extraordinary force, applied, for example, during handling. Films of the present invention are heat sealable, forming good seals around cold, wet products. Finally, such films have a pleasant soft "feel" desirable for many packaging applications.

SUMMARY OF THE INVENTION

The present invention provides a shrink film comprising at least one polymeric layer, at least one said layer consisting essentially of a blend of:

(a) about 10 to about 80 percent by weight of at least one ethylene-alpha olefin linear copolymer having a density of about 0.890 to about 0.914;

(b) about 4 to about 70 weight percent of at least one low-density polyethylene from a tubular reactor, having a density of about 0.920 to about 0.925;

(c) 0 to about 52 weight percent of at least one ethylene-alpha olefin linear copolymer having a density of at least about 0.915; and (d) 0 to about 25 weight percent of at least one copolymer of ethylene with at least one copolymerized vinyl alkanoate, alkyl acrylate, or alkyl methacrylate;

provided that when the amount of component (b) is less than about 15 percent by weight, the amount of component (d) is at least about 1 percent by weight.

Alternatively, the low density polyethylene of (b) can be defined as one having a ratio of weight average molecular weight to number average molecular weight of at least about 8.

The present invention further provides a process of preparing a shrink film comprising:

(a) melt blending the above composition;
(b) extruding the melt blend in the form of a sheet;
(c) cooling the molten polymer in the sheet to below its melting point;
(d) maintaining the sheet of polymer at a temperature below its melting point but sufficiently high that it can be oriented by stretching; and
(e) orienting the sheet of polymer in at least one direction.

DETAILED DESCRIPTION OF THE INVENTION

The present invention is a shrink film made from a blend of at least two, and preferably three components. The first required component is one or more ethylene-alpha olefin linear copolymer having a density of about 0.890 to about 0.914 g/cm$^3$, preferably about 0.912 g/cm$^3$. Such copolymers are known as ultra low density polyethylene (ULDPE) or very low density polyethylene, and are prepared by the copolymerization of ethylene with an alpha olefin, preferably of 4 to about 18 carbon atoms, more preferably 6 to 18 carbon atoms, and most preferably 1-octene The polymerization is generally carried out at low to medium pressure (about 29-30 MPa) in the presence of a coordination catalyst, such as various organoaluminum, organotitanium, or organovanadium compounds. Titanium modified organoaluminum compounds are widely used. An ultra-low density material is obtained by incorporating sufficiently large amounts of the comonomer to achieve the desired low density. Such materials are available commercially from Dow Chemical Company and from Union Carbide Corporation. The copolymer preferably has a melt index of about 0.5 to about 2.0 dg/min, most preferably near 1.0, as is normally desirable for polymers to be used for films. Comparable results can also be obtained by using materials with higher melt index followed by irradiation crosslinking.

The ULDPE is present at about 10 to about 80 percent by weight of the blend, preferably about 40 to about 65 weight percent, and most preferably about 45 to about 60 weight percent. The ULDPE contributes many of the desirable properties to the film, i.e., shrinkage, recovery, and to some extent, tensile strength.

The second required component of this invention is another ethylene polymer, specifically a tubular (branched), low-density polyethylene having a density of about 0.920 to about 0.925, preferably about 0.923. This component is a highly branched low density polyethylene prepared in a tubular reactor. A tubular reactor, like an autoclave, employs high pressures and produces resin in the density range of about 0.917 to about 0.928. In the tubular reactor, ethylene containing a free radical initiator is passed through a preheater where it is heated to 100°-200° C. The mixture is passed through a tube where it heats to 250°-300° C. as polymerization occurs, although some of the heat is removed by cooling. Pressure, temperature, and type of initiator are all variables that affect the properties of the resin in a manner which is known to those skilled in the art. Tubular polymerization reactions are described, for example, in U.S. Pat. Nos. 2,870,130 and 2,839,515.

The distinctions between tubular resins and ordinary resin made e.g. in a high-pressure autoclave process are subtle but important. Such high pressure tubular resins have some desirable properties that are similar to those of LLDPE and some similar to those of ethylene vinyl acetate copolymer. The tubular resins exhibit low modulus, high elongation, and relatively high impact strength compared to similar autoclave resins, and have a soft "feel" similar to that of ethylene copolymer such as ethylene vinyl acetate. Tubular resins mix well with LLDPE and with ULDPE, producing clear films. Autoclave resins of similar gross properties produce a much hazier film. Resins from the tubular process also operate more smoothly in the film forming and packaging process of the present invention. The reasons for these observed differences are not clearly known, but are believed to arise from a higher degree of molecular weight distribution and/or branching in the resins from the tubular process. Molecular weight distribution parameters of some commercially available polyethylene resins (and a related ethylene vinyl acetate copolymer) are shown below. (The higher the value for $M_w/M_n$, the greater the molecular weight distribution.) The $M_w/M_n$ for suitable materials should be at least about 8, preferably at least about 10, and most preferably about 11 to about 14.

| Resin | Process | Density | Melt index | $M_w/M_n$ |
|---|---|---|---|---|
| Dow ™ 503 | High pressure tubular | 0.922 | 1.9 | 11–14 |
| Dow ™ 640 | High pressure autoclave | 0.922 | 2.0 | 3–4 |
| Attane ™ 4001 | Low pressure | 0.912 | 1.0 | 4–5 |
| Dowlex ™ 2045 | Low pressure | 0.920 | 1.0 | 4–5 |
| Elvax ® 3135 (ethylene vinyl acetate) | Autoclave | — | 0.35 | 6–7 |

The melt index of the branched LDPE is preferably about 1 to about 3 and most preferably about 1.9.

The tubular polyethylene comprising the second component is present in an amount of about 4 to about 70 weight percent of the blend. Preferably it is present at about 15 to about 55 weight percent, more preferably 25-50 weight percent, and most preferably about 30 to about 45 weight percent. This ethylene polymer provides stiffness necessary for running the film on certain high speed packaging machines and also contributes to recovery and shrinkage of the film.

The linear ethylene-alpha copolymer of the optional third component is commonly referred to as linear low density polyethylene (LLDPE). It generally has a density of about 0.915 to about 0.940, and preferably about 0.920 to about 0.924. It is prepared by copolymerization of ethylene with an alpha olefin of preferably 4 to about 18 carbon atoms, more preferably 6-18 carbon atoms, and most preferably 1-octene. The polymerization is carried out in a well-known manner similar to that described for ultra low density polyethylene, except that the amount of comonomer is reduced to an appropriate extent. Such polymerization is described, for example in U.S. Pat. No. 4,076,698. The copolymer, as above, preferably has a melt index of about 0.5 to about 2.0 dg/min, most preferably near 1.0. The amount of this material can range up to about 52 weight percent of the composition; preferably it is present in amounts of about 10 to about 40 weight percent, and most preferably about 20 to about 30 percent. This component serves to provide stiffness to the film.

The fourth component is at least one copolymer of ethylene with at least one copolymerized vinyl alkanoate, alkyl acrylate, or alkyl methacrylate. The fourth component is required if the amount of the second component is less than about 15%, in which case it is present in an amount of about 1 to about 25% by weight. More generally this fourth component is present in an amount of 0 to about 25% by weight. It is preferably present in an amount of about 5.5 to about 22 percent, and most preferably about 7 to about 15 percent.

Suitable comonomers for this component include vinyl alkanoates such as vinyl acetate, propionate, or butyrate, and alkyl acrylates and methacrylates wherein the alkyl group is methyl, ethyl, propyl, isopropyl, n-butyl, iso-butyl, pentyl, hexyl, 2-ethylhexyl, and the like. Minor amounts of a third comonomer such as CO or $SO_2$ can also be present. Preferably the comonomer is vinyl acetate; the preferred melt index of this component is about 0.1 to about 10. The comonomer comprises about 3 to about 20 weight percent of the copolymer, preferably about 10 to about 15 weight percent.

The addition of ethylene vinyl acetate (EVA) to the composition is believed to contribute to the recovery and shrinkage properties of the film. It also provides a feel of softness to the film which is desirable, and contributes to the heat sealability.

Of course, mixed comonomers can be used in each of the copolymers of the present invention. For example, a ULDPE which includes both octene and hexene as comonomers could be suitable. Similarly, a terpolymer of ethylene with vinyl acetate and e.g. methyl acrylate could be suitable as the third polymeric component. Likewise each of the major components can itself be a blend of suitable polymers selected from the available polymers for that component.

If desired, the film of the present invention can be crosslinked by e.g. irradiation to improve its properties, particularly to extend the upper operating temperature on e shrink tunnel. Therefore a preferred embodiment provides irradiation of the film with about 1 to about 5 megarads, and most preferably about 2 megarads, of ionizing radiation.

Films of the present invention are preferably used as monolayer films; however, they can equally well serve as one or more layers of a multiple layer film structure. In order to retain the excellent sealing properties, it is preferred that for such a multiple layer structure at least one surface layer is a composition of the present invention.

In addition, other conventional additives can be employed in low amounts in films of this invention, such as fillers, slip agents, antiblock agents, antifog agents, and the like.

Films of the present invention can be manufactured by conventional processes for preparing oriented film. Typically a sheet of film is extruded, most often in the form of a tube, which is then quenched. The sheet or tube is oriented by heating to a temperature below its melting point and stretching in at least one direction. Most commonly such orientation is accomplished by a combination of air pressure and mechanical stretching in the machine direction, in the conventional air bubble process. Further details of film manufacture are provided in the Examples which follow. The shrink film so prepared can be used in conventional packaging operations, which can include wrapping of meat, fish, or poultry items, optionally contained within a tray, heat sealing the film to itself to form a closed, air tight packaged by means of hot wires, hot knives, hot bars, or crimping wheels, and heating the film briefly in a shrink tunnel to cause it to shrink securely around the contents. The resulting packages retain their seals even when the contents are wet, and maintain their shape well even when subjected to distortion during shipping and handling.

EXAMPLES 1-9 AND COMPARATIVE EXAMPLES C1-C4

Films were prepared in a semiworks unit ("SW") or in a commercial unit ("Com1"), as described below. Resin feed for each sample made by the semiworks unit was prepared by dry blending each of the three resin components together. Resin for samples prepared by the commercial unit was prepared by melt blending LLDPE, EVA, and any additives used, and thereafter dry blending this mixture with ULDPE.

The ultra low density polyethylene (ULDPE) was Attane TM 4001, from Dow Chemical, having a density of 0.912 g/cm$^3$ and a melt index of 1.0 dg/min. The EVA copolymer contained 12 percent by weight vinyl acetate moieties and had a density of 0.940 and a melt index of 0.35. Linear low density polyethylene and tubular low density polyethylene were supplied as Dowlex TM 2050A, from Dow Chemical. This material is understood to be a blend of 75 parts LLDPE (Dowlex TM 2045) and 25 parts tubular LDPE. This mixture has a density of 0.921 and a melt index of 1.1.

Samples were prepared by first extruding a single-layer tube through a typical circular die, using the parameters indicated in Table I for a semiworks unit or a commercial unit.

TABLE I

|  | Semiworks | Commercial |
| --- | --- | --- |
| Extruder diameter, mm | 50.8 | 203 |
| Extruded tube diameter, mm | 53 | 361 |
| Tube speed, m/min | 1.8 | 17.7 |
| Bubble pressure, kPa | 1.9-2.5 | 0.35 |
| Film speed, m/min | 7.3 | 71.3 |
| Bubble diameter, m | 0.318 | 1.80 |

The extruded tube was passed over an internal quenching mandrel maintained at 20° C. The tubing was reheated to a temperature below the melting point of the polymer (about 110°-115° C.). Simultaneously with the heating, the tube was stretched in the transverse direction (TD) by blowing air into the tubing, and in the machine direction (MD) by pulling the film with rollers running three to five times the tube speed. The air was introduced into the tube at a pressure sufficient to expand the tube to about five times its original diameter, producing a hoop stress in the expanded bubble of about 14-17 MPa (2000-2500 kpsi).

Tensile strength, modulus, and elongation of the resulting films were measured by ASTM D882. Shrinkage was measured by ASTM D2732, and area shrinkage calculated from the expression 1-(1-MD shrink)×1-TD shrink))×100%. Recovery from deformation was determined by placing a 25.4 mm (1 inch) wide sample of film in an Instron TM, having its jaws set initially to a 254 mm (10 inch) gap. The sample was stretched to 292 mm (11.5 inches) at a rate of 25.4 mm per minute. Tension on the sample was maintained for 5 minutes and thereafter released. The length of the sample after 5 minutes and 60 minutes recovery time was measured, and the percent recovery was calculated. The results of these measurements, reported in Table II, show that for each of the Examples of the invention, all of the pertinent properties of the film were within or nearly within the desired region. Comparative Example C1, which uses an insufficient amount of EVA and is at the lower limit of ULDPE, exhibits insufficient shrinkage at both 90 and 110, and borderline low recovery of deformation at 5 minutes. Comparative Example C2, which lacks LLDPE and tubular LDPE, exhibits unacceptably low modulus. Comparative Examples C3 and C4, which lack ULDPE, exhibit low shrinkage and low or borderline recovery. Example 2 exhibits borderline shrinkage; it is at the lower limit of the present invention in terms of ULDPE content. Example 3 likewise exhibits borderline shrinkage and recovery; it is near the lower limit of the invention in terms of EVA content. Example 4 exhibits borderline recovery properties; it is near the upper limit of the invention in terms of EVA content.

TABLE II

| | Tens. Str. | Modulus | Elonga- |

TABLE II-continued

| Ex. | Unit | % ULDPE | % EVA | % LLDPE | %ᵃ LDPE | MPa MD | MPa TD | MPa MD | MPa TD | tion. % MD | TD |
|---|---|---|---|---|---|---|---|---|---|---|---|
| C1 | SW | 10 | 5 | 64 | 21 | 84 | 104 | 242 | 254 | 189 | 155 |
| 1 | SW | 80 | 5 | 11 | 4 | 81 | 88 | 155 | 172 | 257 | 123 |
| 2 | SW | 10 | 20 | 53 | 17 | 67 | 92 | 224 | 222 | 247 | 165 |
| C2 | SW | 80 | 20 | 0 | 0 | 85 | 104 | 130 | 139 | 227 | 151 |
| C3 | SW | 0 | 12.5 | 66 | 21.5 | 63 | 74 | 171 | 172 | 254 | 118 |
| 3 | SW | 45 | 2 | 40 | 13 | 82 | 94 | 205 | 212 | 268 | 131 |
| 4 | SW | 45 | 21 | 22.5 | 8.5 | 71 | 85 | 175 | 192 | 261 | 130 |
| 5 | SW | 45 | 12.5 | 32 | 10.5 | 78 | 95 | 162 | 185 | 250 | 147 |
| 6 | SW | 55 | 8 | 28 | 9 | 70 | 77 | 148 | 161 | 262 | 126 |
| 7 | Coml | 55 | 8 | 28 | 9 | 80 | 84 | 179 | 193 | 154 | 154 |
| 8 | Coml | 55 | 8 | 28 | 9 | 77 | 87 | 172 | 186 | 147 | 152 |
| 9 | SW | 60 | 7 | 25 | 8 | 77 | 77 | 200 | 193 | 231 | 124 |
| C4 | Coml | 0 | 1 | 74 | 25 | 83 | 98 | 303 | 338 | 164 | 144 |

| Ex. | Recovery, % 5 min MD | TD | 60 min MD | TD | Shrinkage, % 90° MD | TD | Area | 110° MD | TD | Area |
|---|---|---|---|---|---|---|---|---|---|---|
| C1 | 85 | 90 | 92 | 93 | 6 | 15 | 20 | 32 | 46 | 63 |
| 1 | 93 | 90 | 98 | 93 | 13 | 24 | 34 | 54 | 61 | 82 |
| 2 | 91 | 91 | 93 | 94 | 10 | 20 | 28 | 43 | 55 | 74 |
| C2 | 89 | 91 | 91 | 94 | 15 | 26 | 37 | 57 | 64 | 85 |
| C3 | 85 | 89 | 89 | 92 | 7 | 21 | 27 | 42 | 50 | 71 |
| 3 | 86 | 88 | 90 | 92 | 12 | 18 | 28 | 47 | 54 | 76 |
| 4 | 86 | 88 | 90 | 92 | 12 | 25 | 34 | 51 | 61 | 81 |
| 5 | 88 | 89 | 90 | 93 | 15 | 27 | 38 | 56 | 63 | 84 |
| 6 | 85 | 90 | 89 | 96 | 12 | 20 | 30 | 47 | 55 | 76 |
| 7 | 88 | 90 | 90 | 95 | 16 | 19 | 32 | 53 | 58 | 80 |
| 8 | 85 | 91 | 91 | 95 | 14 | 20 | 31 | 53 | 59 | 81 |
| 9 | — | — | — | — | — | — | — | 49 | 57 | 78 |
| C4 | 83 | 88 | 87 | 87 | 6 | 13 | 18 | 30 | 42 | 59 |

— indicates the measurement was not made.
ᵃtubular low density polyethylene in every case.

EXAMPLES 10-14

Samples were prepared and tested as indicated for Examples 1-9. The low density polyethylene used in these Examples was Dow ™ LDPE 503, from Dow Chemical, a highly branched polymer believed to be made in a tubular reactor, having a density of 0.923 and a melt index of 1.9. The results, reported in Table III, show that when this highly branched LDPE is used, neither the LLDPE nor the EVA are required.

TABLE III

| Ex. | Unit | % ULDPE | % EVA | % LLDPE | % LDPEᵃ | Tens. Str. MPa MD | TD | Modulus MPa MD | TD | Elongation, % MD | TD |
|---|---|---|---|---|---|---|---|---|---|---|---|
| 10 | SW | 55 | 8 | 28 | 9 | 91 | 99 | 154 | 160 | 224 | 140 |
| 11 | SW | 55 | 8 | 13 | 24 | 74 | 110 | 156 | 148 | 198 | 142 |
| 12 | SW | 55 | 8 | 0 | 37 | 78 | 91 | 145 | 152 | 184 | 135 |
| 13 | SW | 63 | 0 | 13 | 24 | 78 | 107 | 156 | 152 | 207 | 138 |
| 14 | SW | 63 | 0 | 0 | 37 | 73 | 89 | 156 | 151 | 180 | 132 |

| Ex. | Recovery, % 5 min MD | TD | 60 min MD | TD | Shrinkage, % 90° MD | TD | Area | 110° MD | TD | Area |
|---|---|---|---|---|---|---|---|---|---|---|
| 10 | 91 | 91 | 94 | 95 | 12 | 22 | 31 | 54 | 64 | 83 |
| 11 | 92 | 91 | 95 | 95 | 15 | 25 | 36 | 55 | 65 | 84 |
| 12 | 92 | 91 | 95 | 94 | 14 | 30 | 40 | 61 | 67 | 87 |
| 13 | 90 | 90 | 94 | 94 | 12 | 24 | 33 | 56 | 66 | 86 |
| 14 | 90 | 90 | 94 | 93 | 16 | 28 | 40 | 60 | 70 | 88 |

ᵃThe low density polyethylene was in each case from a tubular process.

COMPARATIVE EXAMPLE C5

Packages were made on an FMC ™ horizontal form and fill machine. A tube was formed from the film of Comparative Example C4 using heated wheels to form a seal between two edges along the length of the tube. Trays of chicken were pushed into the tube from the open end. The tube and tray were advanced and a ho knife bar cut the tube and sealed the trailing end. Packages so prepared exhibited gaps in the sealed area formed by the heated wheels in about every third package.

EXAMPLES 15 AND 16

Packages were made on a commercial scale from the film of Examples 7 and 8, respectively, using the process of Comparative Example C5. Observation of several thousand packages so prepared revealed no apparent defects or leaks in the seal areas.

EXAMPLES 17-21

Tubes (but not packages) were prepared from the films of Examples 10-14. Tubes from the films of Examples 10, 11, and 12 exhibited good seals. Tubes from the films of Examples 13 and 14 exhibited about 1 seal defect every 6 meters (20 feet). Since a package typically requires about 30 cm (1 foot) of tube, this corresponds to about a 5% defect rate.

EXAMPLE 22 AND COMPARATIVE EXAMPLES C5 AND C6

Table IV shows the results of runs in a semiworks unit comparing tubular and autoclave LDPE resins and in addition a run in which the tubular LDPE was replaced by linear low density polyethylene. Example 12, from Table III, is presented again for ease of comparison. The results show improved shrinkage properties for films which contain the specified amount of tubular low density polyethylene.

TABLE IV

| Ex. | Unit | % ULDPE | % EVA | % LLDPE | %, type LDPE | Tens. Str. MPa MD | Tens. Str. MPa TD | Modulus MPa MD | Modulus MPa TD | Elongation, % MD | Elongation, % TD |
|---|---|---|---|---|---|---|---|---|---|---|---|
| 22 | SW | 55 | 8 | 19 | 18, T | 76 | 82 | 236 | 263 | 224 | 151 |
| 12 | SW | 55 | 8 | 0 | 37, T | 78 | 91 | 145 | 152 | 184 | 135 |
| C5 | SW | 55 | 8 | 0 | 37, A | 61 | 72 | 272 | 314 | 219 | 127 |
| C6 | SW | 55 | 8 | 37 | 0 | 81 | 81 | 262 | 262 | 210 | 186 |

| Ex. | Recovery, % 5 min MD | Recovery, % 5 min TD | Recovery, % 60 min MD | Recovery, % 60 min TD | Shrinkage, % 90° MD | Shrinkage, % 90° TD | Shrinkage, % 90° Area | Shrinkage, % 110° MD | Shrinkage, % 110° TD | Shrinkage, % 110° Area |
|---|---|---|---|---|---|---|---|---|---|---|
| 22 | 89 | 89 | 93 | 93 | 13 | 23 | 33 | 53 | 66 | 84 |
| 12 | 92 | 91 | 95 | 94 | 14 | 30 | 40 | 61 | 67 | 87 |
| C5 | 85 | 88 | 90 | 92 | 9 | 17 | 24 | 34 | 53 | 69 |
| C6 | 85 | 86 | 90 | 92 | 10 | 21 | 29 | 39 | 53 | 71 |

A - low density polyethylene was in this case from an autoclave process.
T - low density polyethylene was in this case from a tubular process.

The film of Example 12, using tubular LDPE, exhibits an area shrinkage 26% greater than that of Comparative Example C5, using an autoclave resin, when measured at 110° C., and fully 67% greater when measured at 90° C. Similar results are observed when Example 12 is compared with Comparative Example C6, in which no tubular LDPE was used. There are also measurable increases in the amount of recovery after 5 minutes and 60 minutes.

EXAMPLES 23-27

A mixture of 81% Dowlex TM 2050A (LLDPE+ tubular LDPE, described above), 17% of the ethylene vinyl acetate copolymer described in Example 1, 1% Atmer TM 645 antifogging agent, 0.6% erucamide, and 0.4% White Mist TM silica was prepared by melt blending after weighing each component. This blend was then dry blended with Attane TM 4001 ultra low density polyethylene to achieve the blends indicated in Table V, below. Films were prepared on a commercial unit as described above. Packages were prepared from each such film using a WTS 24 packaging machine from FMC Corporation. This machine is designed for wrapping poultry or meat in trays. The heat sealing is done by a hot knife which welds two sheets together to form a seal. Since this is a comparatively high speed machine, proper flow properties are required in the polymeric film in order to provide a seal free from pin holes. A pin hole-free seal is not an absolute requirement for most shrink film applications, but it is generally considered to be such for packaging of fresh poultry.

TABLE V

| Ex. | EVA % | LLDPE % | Tubular LDPE % | ULDPE % | Quality of Seal |
|---|---|---|---|---|---|
| 23 | 4.7 | 16.8 | 5.6 | 72.9 | poor, pinholes |
| 24 | 5.3 | 18.9 | 6.3 | 69.4 | poor, pinholes |
| 25 | 6.3 | 22.5 | 7.5 | 63.7 | good |
| 26 | 7.5 | 26.8 | 8.9 | 56.8 | good |
| 27 | 8.0 | 28.6 | 9.5 | 53.9 | good |

The results suggest that for preparing seals suitable for a cold, wet poultry pack, from a film containing a relatively low amount of tubular LDPE, the amount of EVA or comparable material is preferably at least about 5.5 weight percent, and more preferably at least about 7 weight percent.

I claim:

1. A shrink film comprising at least one polymeric layer, at least one said layer consisting essentially of a blend of:
    (a) about 10 to about 80 percent by weight of at least one ethylene-alpha olefin linear copolymer having a density of about 0.890 to about 0.914;
    (b) about 4 to about 70 weight percent of at least one branched low-density polyethylene from a tubular reactor having a density of about 0.920 to about 0.925 and a ratio of weight average molecular weight to number average molecular weight of at least about 8; and
    (c) 0 to about 52 weight percent of at least one ethylene-alpha olefin linear copolymer having a density of at least about 0.915; and
    (d) 0 to about 25 weight percent of at least one copolymer of ethylene with at least one copolymerized vinyl alkanoate, alkyl acrylate, or alkyl methacrylate;
    provided that when the amount of component (b) is less than about 15 percent by weight, the amount of component (d) is at least about 1 percent by weight, said shrink film being obtained by stretching in at least one direction a sheet or tube of the composition at a temperature below its melting point.

2. The shrink film of claim 1 wherein the ratio of weight average molecular weight to number average molecular weight of the polymer of (b) is at least about 10.

3. The shrink film of claim 1 wherein the ratio of weight average molecular weight to number average molecular weight of the polymer of (b) is about 11 to about 14.

4. The shrink film of claim 1 wherein the film is a single layer.

5. The shrink film of claim 1, comprising a plurality of polymeric layers.

6. The shrink film of claim 1 wherein the alpha olefin of copolymer (a) has 6 to 18 carbon atoms.

7. The shrink film of claim 1 wherein the alpha olefin of copolymer (a) is 1-octene.

8. The shrink film of claim 1 wherein copolymer (a) comprises about 40 to about 65 weight percent of the composition.

9. The shrink film of claim 1 wherein copolymer (a) comprises about 45 to about 60 weight percent of the composition.

10. The shrink film of claim 2 wherein polymer (b) comprises about 25 to about 55 weight percent of the composition.

11. The shrink film of claim 2 wherein polymer (b) comprises about 30 to about 45 weight percent of the composition.

12. The shrink film of claim 2 wherein copolymer (d) is a copolymer of ethylene and vinyl acetate.

13. The shrink film of claim 12 wherein the ethylene vinyl acetate copolymer of (d) contains about 3 to about 20 weight percent copolymerized vinyl acetate moieties.

14. The shrink film of claim 12 wherein the ethylene vinyl acetate copolymer of (d) contains about 10 to about 15 weight percent copolymerized vinyl acetate moieties.

15. The shrink film of claim 1 wherein copolymer (d) comprises about 5.5 to about 22 weight percent of the composition.

16. The shrink film of claim 1 wherein copolymer (d) comprises about 7 to about 15 weight percent of the composition.

17. The shrink film of claim 1 wherein the film is crosslinked to the degree induced by an irradiation dosage of about 1 to about 5 megarads of ionizing radiation.

18. A process for preparing the shrink film of claim 1 comprising:
 (a) melt blending the composition of claim 1;
 (b) extruding a sheet of the melt blend;
 (c) cooling the molten polymer in the sheet to below its melting point;
 (d) maintaining the sheet of polymer at a temperature below its melting point but sufficiently high that it can be oriented by stretching; and
 (e) orienting the sheet of polymer in at least one direction.

* * * * *